United States Patent Office 3,632,657
Patented Jan. 4, 1972

3,632,657
CRYSTALLINE PROPYLENE GLYCOL
William L. Howard, Lake Jackson, Tex., assignor to The Dow Chemical Company, Midland, Mich.
No Drawing. Filed June 22, 1967, Ser. No. 647,926
Int. Cl. C07c 31/20, 29/24
U.S. Cl. 260—635 R                      7 Claims

ABSTRACT OF THE DISCLOSURE

Propylene glycol can be crystallized by seeding the glycol or a solution thereof with crystalline propylene glycol, thus effecting a purification of the glycol. While the racemic glycol cannot be crystallized without seeding, the enantiomorphs can be crystallized separately without seeding, thus providing seed crystals.

BACKGROUND OF THE INVENTION

Although propylene glycol has been known in the racemic form for more than a century and in the optically active forms for about half a century, it has not heretofore been known in crystalline form.

SUMMARY OF THE INVENTION

According to the invention, racemic propylene glycol is resolved into its optical isomers by any known technique. The optically active isomer can be crystallized by cooling either the pure glycol or a solution thereof in a suitable solvent to a temperature well below the melting point of the crystalline material and then inducing crystallization by any known means, such as by rubbing the side of a glass container, below the liquid surface, with a glass rod. Once crystalline glycol is obtained, either racemic or active, it can be used to seed other batches to produce crystallization in either the racemic or the optically active glycol. Since the crystalline material melts in the vicinity of −35° C., it is preferable to cool the material to be crystallized to a point well below −35°, e.g. −40° or lower, even to temperatures of around −125°. The preferred temperature is usually −75° to −40° C.

While a solvent is not necessary, it is usually preferable to use one, especially when the primary objective in the crystallization is purification of the glycol. Suitable solvents must, of course, have freezing points below the temperatures to be used in the crystallization. In addition, they should dissolve substantial proportions of the glycol so that the required volume of solvent is not excessively large. It is usually most convenient to work with solvents in which the glycol is soluble to the extent of at least 5% by weight, based on the saturated solution. Such solvents include many of the common alcohols, ketones, ethers, glycol monoethers, etc., such as n-propanol, sec.-butanol, acetone, mixtures of acetone and ethyl ether, ethyl acetate and ethanol, and ethyl acetate and acetone. Methanol or ethanol alone are unsuitable. Acetone, alone or in combination with one or more of the above solvents is the preferred solvent. Acetone has the unusual property that even though it dissolves less than 2% by weight of crystalline propylene glycol at −78° C., a 50% solution of the liquid glycol in acetone does not separate into two liquid layers at this temperature. Thus, when a 50% solution is cooled to −78° and seeded, or otherwise induced to crystallize, about 95% of the glycol is recovered in crystalline form from a single stage of crystallization.

Water interferes with the crystallization; hence the glycol and solvent should be substantially anhydrous for best results. If the glycol contains more than about 10% of water, crystallization may not occur.

DETAILED DESCRIPTION OF THE INVENTION

The practice of the invention is illustrated by the following examples.

EXAMPLE 1

Crystalline d-propylene glycol

Pure d-propylene glycol was prepared from the racemic mixture by (1) converting the glycol to the cyclic ketal of l-menthone, (2) separating the lowest-boiling of the four diastereoisomeric ketals by fractional distillation and (3) recovering the glycol from the ketal by acid hydrolysis. This process is more fully described in my joint copending application with Joanne D. Burger entitled "Resolution of Optical Isomers of Propylene Glycol and Certain Ketones," filed June 22, 1967 as Ser. No. 647,925 and now matured into Pat. No. 3,491,152.

A sample of about 0.5 ml. of d-propylene glycol (>99% optical purity, >99% compositional purity) was placed in a Pyrex glass test tube about 0.5 inch in diameter. A freshly broken Pyrex glass rod of somewhat smaller diameter was inserted into the liquid and the glycol and immersed part of rod and tube cooled to a temperature below −40° C. When the system had attained this desired temperature the rod was pressed against the bottom of the tube and twisted so that the glass surfaces rubbed against each other with a thin film of the glycol in or about the points of contact; or the end of the rod may be moved up and down against the tube. Crystals soon appeared on the scratched surfaces and spread throughout the mass.

Next a sample of dl-propylene glycol was chilled below −40° C. and seed crystals of the above d-isomer were stirred into the cooled liquid. Crystallization proceeded from these seeds throughout the mass of liquid until the whole sample was crystalline. These dl-crystals can be used in the same way to seed either racemic or optically active propylene glycol.

Crystalline d-propylene glycol is a colorless solid that melts between −35° and −29° C. and apparently exists in two allotropic forms. It begins to melt at −35°, resolidifies at −33°, and remelts at −31.6 to −29.3°. The racemic materials melt at −31.6 to −29.3°.

Present day commercial propylene glycol contains several trace impurities, some known and some unknown. In order to demonstrate the effectiveness of crystallization in the purification of the glycol and to illustrate the use of a solvent in crystallization, the following experiments were carried out.

EXAMPLE 2

Propylene glycol was purified by distillation until no trace of any of several known contaminants could be detected by highly sensitive gas chromatography. A sample of this glycol was then intentionally contaminated with 0.2% of a mixture of impurities known to be in the commercial propylene glycols of several vendors.

A portion of the treated glycol (100 parts) was then dissolved in acetone (400 parts, both being parts by volume) and the mixture was chilled to Dry Ice temperature, seeded with crystals of propylene glycol, stirred for an hour, and filtered. The crystals were sucked as dry as possible on the funnel for about a minute, without pressing the crystals. The crystals, still wet with the solvent held in the filter cake, were melted and the acetone was removed under reduced pressure, the liquid being finally heated to about 60° at 1 mm. of mercury pressure.

Gas chromatograms of the original mixture and of the glycol recovered by the above treatment showed that the concentration of impurities in the crystallized material was dramatically less than in the original mixture, and that the concentration of remaining impurities was in about the same proportion to their initial concentration as amount of solvent held by the filter cake was to amount of solvent in the filtrate. Numerically the impurities had been reduced to about 10% of their concentration in the original mixture.

EXAMPLE 3

A sample of the specially distilled propylene glycol of Example 2 was contaminated with 0.1% of ethylene glycol, a known impurity in many commercial propylene glycols. Crystallization in the manner of Example 1 resulted in the concentration of ethylene glycol in the recovered propylene glycol being reduced to about 20% of its initial value.

EXAMPLE 4

Propylene glycol is widely used as a solvent for food additives such as flavoring materials and the like. A sample of the specially distilled propylene glycol of Example 2 was contaminated with 500 parts per million of menthol and crystallized once from acetone as in Example 2. Both the melted crystals with their retained solvent and the filtrate were stripped of acetone at reduced pressure as in Example 2, and the glycol from both of these sources was compared with the original mixture by a taste test in which a 5% solution of the test glycol in water was tasted. The results were as follows: glycol from crystals—very weak minty sensation; glycol from filtrate—very strongly minty; original glycol mixture—moderately minty.

EXAMPLE 5

Recrystallization of commercial propylene glycol of USP grade several times from 25% solutions in acetone reduced the concentration of dipropylene glycols from easily detectable levels to undetectability by sensitive gas chromatography.

EXAMPLE 6

A sample of 25 ml. of partially resolved $l$-propylene glycol that was 97.5% glycol and 2.5% water, and in which the glycol was 95% $l$-form and 5% $d$-form, was dissolved in 75 ml. of acetone. The solution was chilled in a bath of Dry Ice and acetone and seeded with a small amount of crystalline racemic glycol. Crystallization occurred on standing in the cold bath, and after 18 hours the mother liquor was decanted from the dense mass of crystals adhering to the bottom of the flask. Stripping the solvent from the mother liquor left about 10 ml. of glycol that consisted of 90% $l$-form and 10% $d$-form. The crystals, stripped of residual acetone, gave about 15 ml. of glycol that was more than 99%— the $l$-enantiomer.

I claim:
1. Crystalline 1,2-propylene glycol.
2. The compound of claim 1 in the racemic form.
3. The compound of claim 1 in the form of its optically active $d$-isomer.
4. The compound of claim 1 in the form of its optically active $l$-isomer.
5. The method of making crystalline propylene glycol comprising cooling optically active propylene glycol to a temperature below $-29°$ C. and, while maintaining such a temperature, frictionally contacting glass-to-glass surfaces in contact with said glycol.
6. The method of making crystalline propylene glycol comprising contacting non-crystalline propylene glycol with seed crystals of propylene glycol at a temperature below $-29°$ C., the non-crystalline glycol being dissolved in a liquid organic solvent selected from the group consisting of n-propanol, sec.-butanol, acetone, a mixture of acetone and ethyl ether, a mixture of ethyl acetate and ethanol, and a mixture of ethyl acetate and acetone.
7. The method of claim 6 wherein the solvent is acetone.

References Cited

UNITED STATES PATENTS 2,233,606   3/1941   Hass _____ 260—637
2,734,919   2/1956   Amiard et al. _____ 260—707

OTHER REFERENCES

Curme, "Glycols" (1952), pp. 210 to 218.
Vogel, "Practical Organic Chemistry," 3rd ed. (1957), pp. 122 to 130.
Shieh et al., "J. Org. Chem.," vol. 24 (1959), p. 1169

LEON ZITVER, Primary Examiner
J. E. EVANS, Assistant Examiner

U.S. Cl. X.R.
260—637 R, 707